United States Patent
Tiemann

[11] Patent Number: 6,119,588
[45] Date of Patent: Sep. 19, 2000

[54] COMBINATION HORIZONTAL AND VERTICAL ROASTING RACK

[75] Inventor: Frank Tiemann, Braham, Minn.

[73] Assignee: T & L Nifty Products, Inc., Braham, Minn.

[21] Appl. No.: 09/407,699

[22] Filed: Sep. 28, 1999

[51] Int. Cl.[7] .............................. A23L 1/00; A47J 37/00; A47J 37/04; A47J 43/00; A47J 43/18

[52] U.S. Cl. .............................. 99/426; 99/449; 99/450; 211/181.1

[58] Field of Search .................... 99/426, 427, 444–450, 99/394; 16/262; 126/9 R, 25 R; 211/181.1, 175, 49.1, 60.1; 248/166, 172; 294/1.1, 15, 152, 164, 169; D7/409

[56] References Cited

U.S. PATENT DOCUMENTS

| | | | |
|---|---|---|---|
| 691,833 | 1/1902 | Williamson | 99/426 |
| 3,363,544 | 1/1968 | Eriksen | 99/426 |
| 3,392,665 | 7/1968 | Harnest | 99/426 |
| 4,557,188 | 12/1985 | Spanek | 99/415 X |
| 4,633,773 | 1/1987 | Jay | 99/446 X |
| 4,709,626 | 12/1987 | Hamlyn | 99/449 |
| 4,848,217 | 7/1989 | Koziol | 99/419 |
| 4,924,768 | 5/1990 | Jay | 99/425 |
| 5,069,117 | 12/1991 | Schlessel | 99/419 |
| 5,081,916 | 1/1992 | Kuhling et al. | 99/426 X |
| 5,301,602 | 4/1994 | Ryczek | 99/345 |
| 5,575,198 | 11/1996 | Lowery | 99/426 |
| 5,842,409 | 12/1998 | Loffler et al. | 99/426 X |

*Primary Examiner*—Timothy Simone
*Attorney, Agent, or Firm*—James R. Cwayna

[57] ABSTRACT

A formed rack providing a plurality of horizontally extending, spaced rods with extending wire formed handles for lifting. The rack provides a first horizontal surface, formed of the spaced rods, upon which foodstuffs may be placed for roasting or baking with a pair of formed members having their bottommost portions constructed to be interlocked with selected of the horizontal rods to provide a pair of vertically arranged poultry receiving elements which are receivable into the interior of a poultry carcass to hold the same in upright position. The vertical members also interlock with one another at ninety degree angles to provide support for the carcass placed thereon and hold the same in a vertical position during baking or roasting.

6 Claims, 5 Drawing Sheets

COMBINATION HORIZONTAL AND VERTICAL ROASTING RACK

RELATED APPLICATIONS

Applicant has no application currently on file with the Patent and Trademark Office which should be considered during the prosecution of this application and is unaware of any applications on file by others that should be so considered.

SPONSORSHIP

This invention was not made under sponsorship by any individual or organization nor under any Federal sponsorship.

FIELD OF THE INVENTION

This invention relates generally to roasting racks for foodstuffs and more particularly to such a rack which will receive and hold an article in either horizontal or vertical position during roasting or cooking with the vertical arrangement being primarily directed to the roasting or cooking of poultry to hold the carcass in a vertical position during preparation.

SHORT SUMMARY OF THE INVENTION

A roasting rack having a generally horizontal surface provided of a plurality of spaced rods or bars with removable handles arranged the ends thereof and with certain of the rods or bars formed to provide elevating legs or feet to the horizontal surface and further including a pair of formed interlacing members which are formed at their lowermost ends with rod receiving and connective portions to interlock with the rods or bars of the horizontal surface whereby this formed member may be vertically arranged with respect to the horizontal surface. The vertical members provide a mandril which is receivable into a poultry cavity to hold the poultry carcass in vertical relation during roasting.

The rack then is provided for roasting foodstuffs in two distinctive positions.

BACKGROUND AND OBJECTS OF THE INVENTION

It is well known in the art to provide cooking or roasting racks of formed rods or bars and it is similarly well known to roast or cook, particularly poultry, in either or a horizontal or a vertical position. In most instances, a separate rack or utensil is provided for each of such positions.

With applicant's invention, a single rack is provided which includes a horizontal portion with placeable and removable elements for providing a vertical mandril and thus a vertical position for cooking or roasting, particularly adaptable and useable for the cooking or roasting of poultry.

Applicant's rack also includes removable handles received onto the ends of the horizontal portion by which the rack and foodstuff may be removed from a pan in which it has been prepared.

It is therefore an object of the Applicant's invention to provide a roasting or cooking rack having a horizontally disposed portion and a vertically disposed portion to allow various foodstuffs to be cooked or roasted in either a horizontal or vertical position.

It is a further object of the applicant's invention to provide a roasting or cooking rack providing a horizontal surface to which a vertical mandril may be attached to achieve roasting or cooking in a vertical attitude.

It is yet a further object of the Applicant's invention to provide a roasting or cooking rack having a pair of attachable and removable handles by which the rack may be easily removed from a preparing pan.

These and other objects and advantages of Applicant's invention will more fully appear from the accompanying description made in association with the accompanying drawings.

SHORT DESCRIPTION OF THE DRAWINGS

DESCRIPTION OF A PREFERRED FORM OF THE INVENTION

Figure 1:
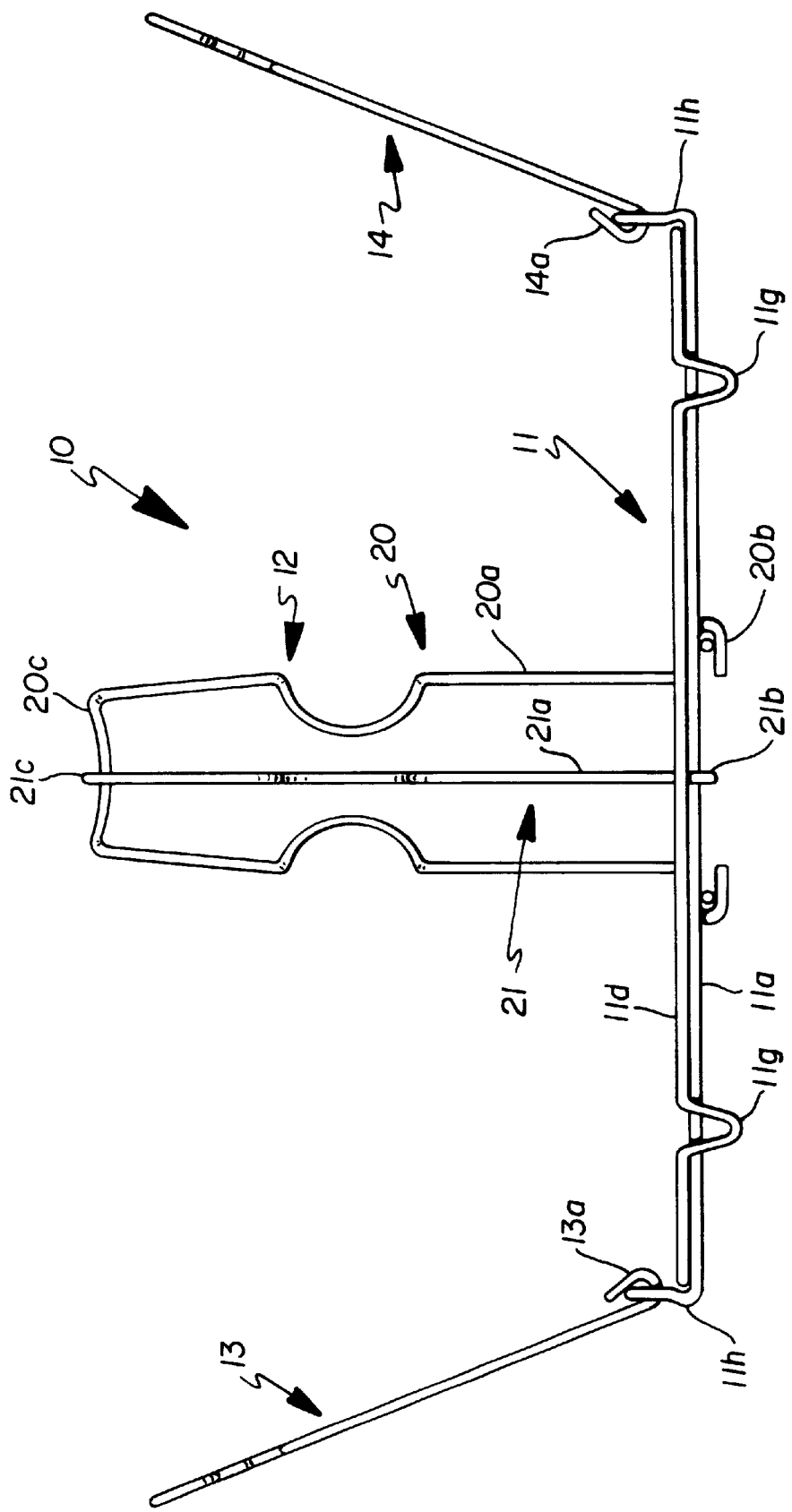
FIG. 1 is a side elevation of the combined horizontal and vertical cooking or roasting rack embodying the concepts of the Applicant's invention, a view from the opposite side being identical thereto.
Figure 2:
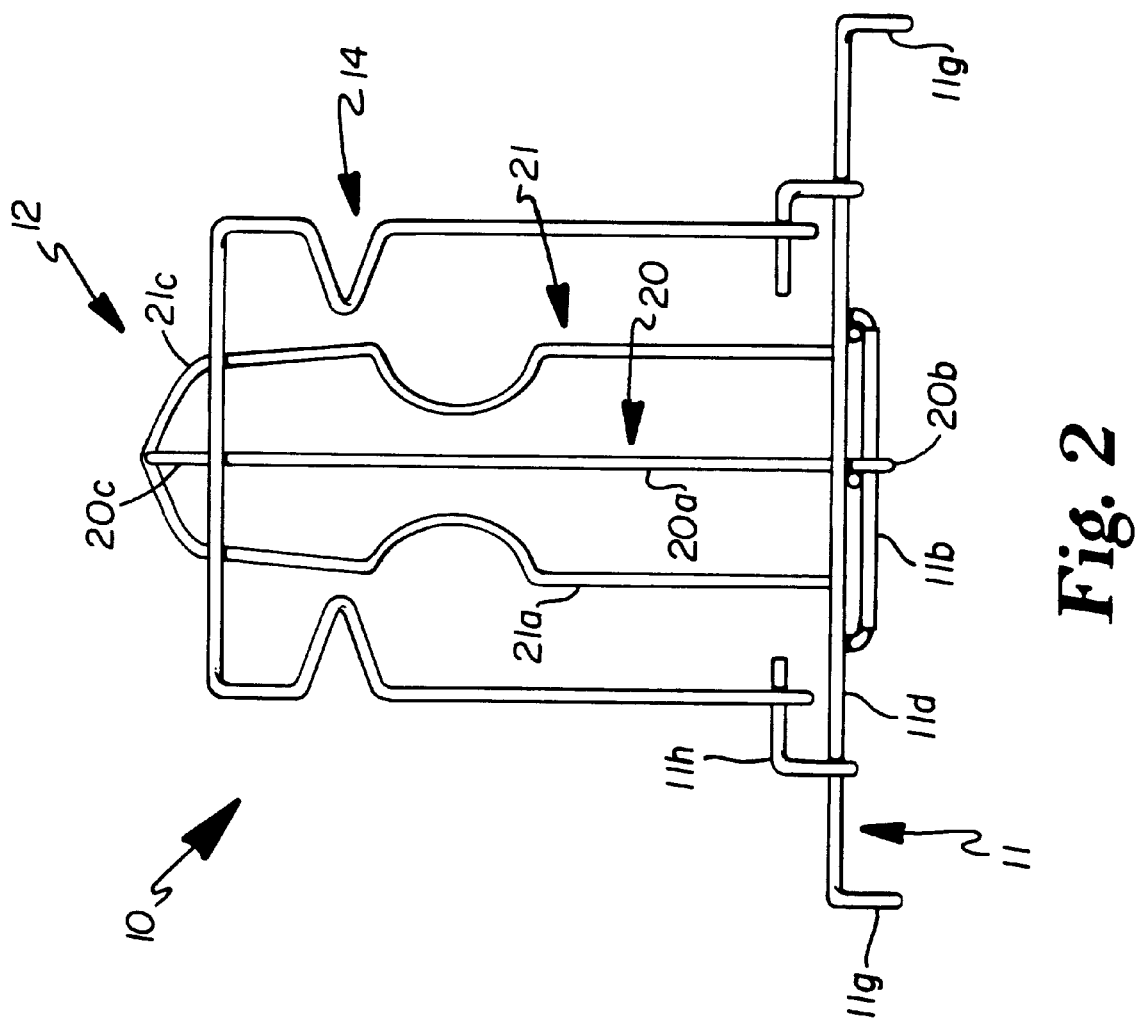
FIG. 2 is an elevation taken from one end of the rack, a view from the opposite side being identical thereto.
Figure 3:
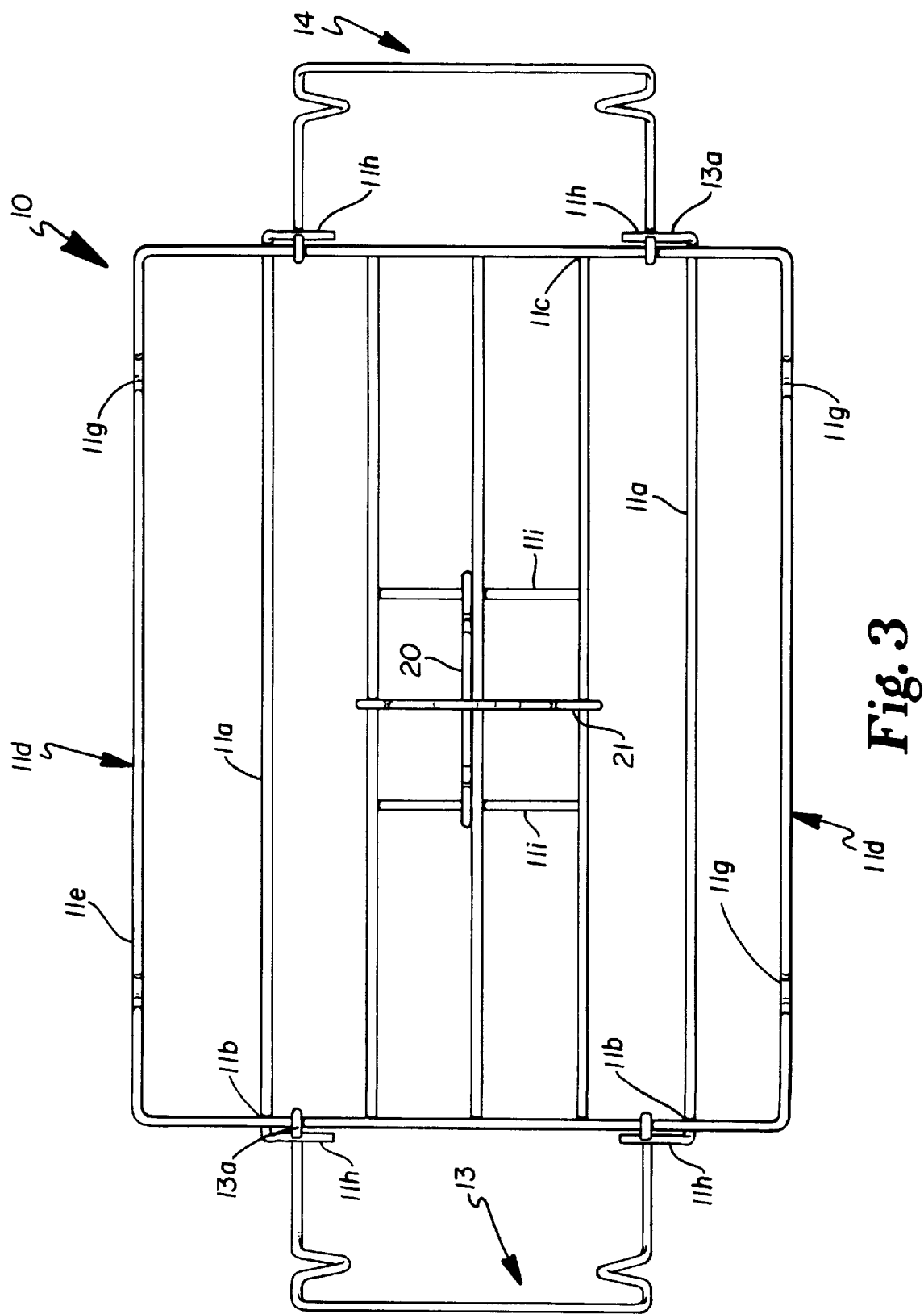
FIG. 3 is a top plan view of the combined rack.
Figure 4:
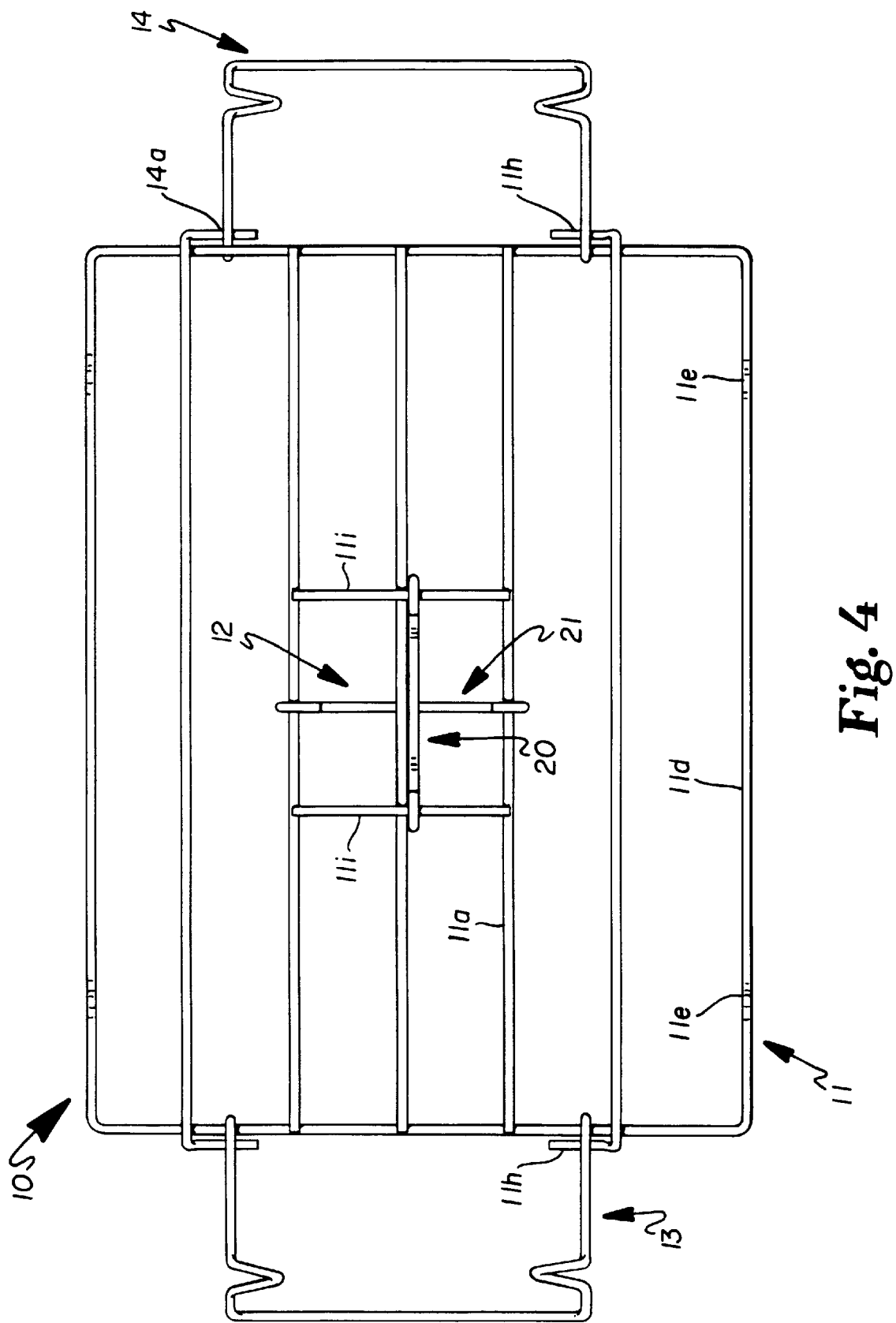
FIG. 4 is a bottom plan view of the rack.

In accordance with the accompanying drawings, the Applicant's invention is designated in it entirety 10 and includes a horizontal support surface 11, a vertical mandril 12 and a pair of removable handles 13, 14.

The support surface 11 includes a plurality of transversely spaced rods or bars 11a having their ends 11b, 11c connected to a circumscribing, generally rectangular ring 11d. The circumscribing ring 11d provides two sides 11e, 11f each having a pair of formed, downwardly directed supports, 11g spaced along the length thereof such that the support surface 11 will be elevated above the surface upon which it is placed.

As illustrated, a selected pair of the rods 11a extend beyond the encircling 11d and are formed with an upwardly and inwardly directed ends 11h to provide accessible, handle receiving ends to which handles 13, 14 may be attached by slightly deforming the handles inwardly and allowing a formed hook end 13a, 14a, the spring tension of the formed handles causing the ends 13a, 14a to expand and secure the handles onto such ends 11h. This arrangement allows for removal of the handles during roasting.

To provide for the vertical mandril 12, a pair of transversely positioned bars 11i are provided between two of the longitudinally extending rods 11a which may be, as shown, centrally located on the rods or bars 11a.

Figure 5:
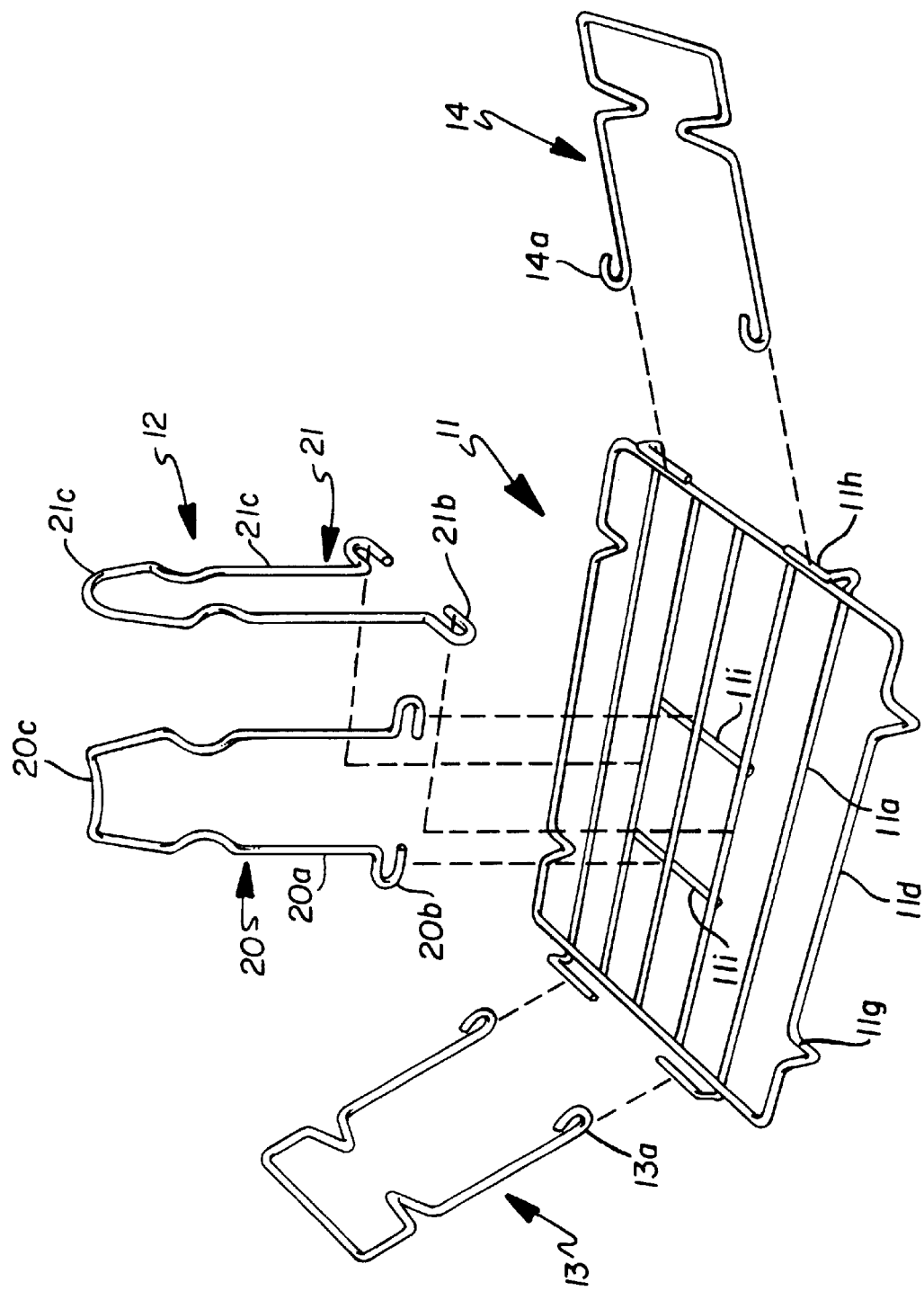
FIG. 5 is an exploded view of the rack and the mandril which forms the vertical foodstuff support of the invention illustrating the removeability of the mandril section and the rack handles.

The mandril 12 consists of two individual elements 20, 21 which are best illustrated in FIG. 5. Each of the elements ifs formed of wire or rod material and each includes a pair of legs 20a, 21a having a hook 20b, 21b formed at the lower ends thereof to respectively be engaged with either one of the longitudinally extending bars or rods 11a or the cross rods 11i such that, when so positioned, the legs 20a, 20b and thus the resulting structure will be in vertical relation to the horizontal portion 11 of the unit. The upper portions 20c, 21c of such members are formed to allow a connecting interfit therebetween and, as illustrated one of the elements 20 provides a downwardly curved surface 20c while the other element 21 provides an upwardly curved surface 21c. When the two members are joined and the bottom hooks 20b, 21b are engaged with the rods or bars and cross bars of the horizontal element 11, a supporting mandril arranged in a vertical position is achieved.

When so positioned, these elements 20, 21 provide a mandril which is received and will support various foodstuffs in vertical position. To obtain such positioning, the legs of the elements are spread and the spring of the material will provide for proper return and positioning.

Applicant's unit then affords the capabilities of either horizontal or vertical roasting roasting while utilizing only rod or bar members which provide for effective and cleaning.

What is claimed is:

1. A combined horizontal and vertical roasting device including'
    a. a horizontal support surface having a plurality of at least longitudinally extending, spaced bar members;
    b. means for joining said bar members to provide a support surface;
    c. a mandril including consisting of two interlocking formed bar members each providing a pair of legs and a top which tops are joinable to provide a connection between said legs; and,
    d. each of said legs having hook means on the lower ends thereof to engage with and lock with said bars of said horizontal support whereby said mandril is vertically positioned on said horizontal support surface.

2. The combined horizontal and vertical roasting device as set forth in claim 1 wherein
    a. said horizontal support includes at least a pair of transversely extending rods across a selected portion thereof; and,
    b. said formed bar members of said mandril are arranged normal to each other to position the hook means in connective position to select of said longitudinally extending bars and said transversely extending bars.

3. The combined horizontal and vertical roasting device as set forth in claim 1 wherein said mandril tops are respectively upwardly and downwardly curved to provide joinder therebetween.

4. The combined horizontal and vertical roasting device as set forth in claim 1 and handle means releasably connectable to said horizontal supporting surface.

5. The combined horizontal and vertical roasting device as set forth in claim 4 wherein
    a. at least a pair of said longitudinally extending bars of said horizontal supporting surface providing hook receiving ends; and,
    b. said handle means including hook means to releasably engage said extending ends.

6. The combined horizontal and vertical roasting device wherein at least a pair of said longitudinally extending bars are provided with downwardly directed portions whereby said horizontal surface is elevated above a supporting surface.

* * * * *